INVENTOR

Bernard Edward Shlesinger Jr

Bernard Edward Shlesinger Jr.

INVENTOR

Bernard Edward Shlesinger Jr.

INVENTOR

Bernard Edward Shlesinger Jr.

United States Patent Office 3,424,881

Patented Jan. 28, 1969

3,424,881

LEAF TYPE SNAP ACTING SWITCH DEVICE OPERATED BY TRANSFER OF ENERGY

Bernard Edward Shlesinger, Jr., 3906 Bruce Lane, Annandale, Va. 22003

Filed Dec. 30, 1966, Ser. No. 606,068

U.S. Cl. 200—67 34 Claims

Int. Cl. H01h *21/04*

ABSTRACT OF THE DISCLOSURE

A snap acting switch device comprising a base member and a flexible sheet secured at one point to the base member and having a movable contact at a point remote from the first point and including an operator generally operating in close proximity to the first point which is secured to the base member so as to cause flexing of the sheet at one end which upon release will permit energy to be transferred through the sheet to the other end so as to cause the other end to rise up in a vertical direction thereby operating a circuit either by passing through a photosensitive area or by coming into wiping contact with a conductor so as to operate a circuit.

This invention relates to snap acting switches for operators having a high rate of speed and operated by transferring kinetic energy put in at one end, to the other end of the switch in order to cause the other end to move so as to operate a circuit, circuit system, or the like.

BACKGROUND AND OBJECTS

Leaf type switches have been known for many years and comprise a substantial portion of the snap acting switch art. The present invention involves the use of a relatively small number of parts and in fact includes only two movable parts for each contact made thereby reducing substantially the overall cost of fast make and break switch type devices or the like.

It is an object of this invention to provide a snap acting switch device which can be manufactured from relatively inexpensive materials with a minimum number of production steps.

Another object of this invention is to provide a snap acting switch device which will operate around corners.

A further object of this invention is to provide a snap acting switch device which can be readily assembled and disassembled.

Still a further object of this invention is to provide a snap acting switch which utilizes plastic or metal components.

Still a further object of this invention is to provide a snap acting switch which has great potential in the field of communications, or in the field of illumination, or in the field of sign development.

Another object of this invention is to provide a snap acting switch device which has a plurality of operators for the purpose of coordinating a series of events or individuals or the like.

These and other objects and advantages will be apparent from the following description and claims.

Figure 1:
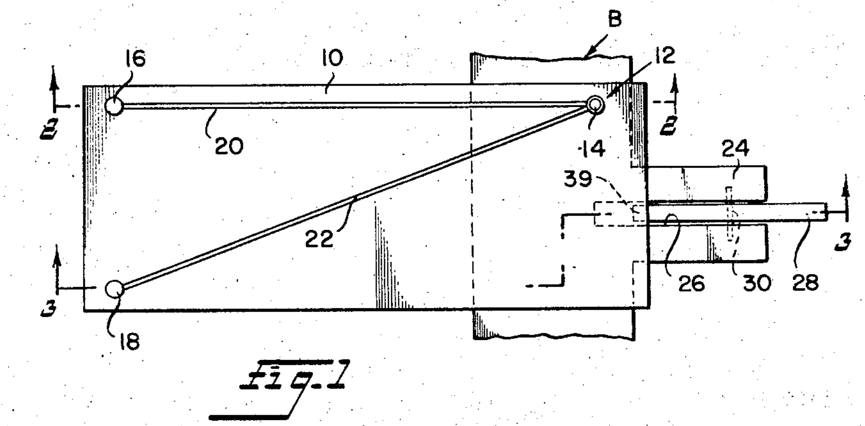
Figure 2:
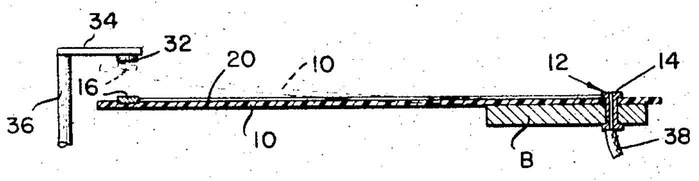
FIGURE 2A is a fragmentary side elevational view showing the wiping action of the device illustrated in FIGURES 2 and 3.
Figure 3:
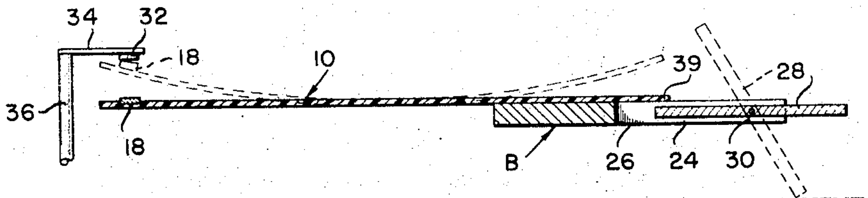

In the accompanying drawings which illustrate by way of example various embodiments of this invention:

FIGURE 1 is a top plan view showing one embodiment of this invention;

FIGURES 2 and 3 are fragmentary cross sectional views taken along the lines 2—2 and 3—3 and viewed in the direction of the arrows;

*FIGURES 1 through 3*

As best illustrated in FIGURE 1, the base B supports a rectangular sheet member 10 which is secured to the base at a point generally indicated by 12 by means of a rivet or other fastening device 14. The rivet 14 is conductive and is connected to two contacts 16 and 18 by means of printed circuits 20 and 22. To the left of the point 12 and the rivet 14 as viewed from above, is a support arm 24 connected to the base B. The support arm 24 has a slot 26 which extends into the base B. The slot 26 includes a rotating operator 28 which pivots on a pin 30.

Supported above the sheet or leaf member 10 is a stationary contact 32 which is fixed to a supporting member 34. Leads 36 and 38 respectively carry current from the contact 32 through the contact 16 and thence to the printed circuit 20, the pin 14 and the lead 38 for operating a circuit (not shown) or the like.

Figure 2A:
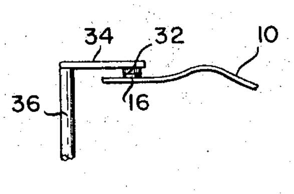

FIGURE 2A for illustration purposes shows the contacts 32 and 16 in engagement and the sheet or strip 10 in a somewhat upwardly flexed position due to the release of energy as the sheet 10 moves upwardly into contact position. The upward bow in the sheet 10 caused by contact of the movable contact 16 with the stationary contact 32 in effect causes a sliding action of the two contacts against each other so as to give a positive wipe thereby cleaning the contacts each time they engage each other.

OPERATION OF FIGURES 1–3

The sheet material comprising the sheet or strip or leaf 10 may be conductive metal or plastic or non-conductive metal or plastic. It may be printed with a circuit such as circuits 20 and 22 or it may be plain. When the rotating operator 28 engages the non-fixed side of the sheet 10, and raises it upwardly until it is released, the sheet 10 will slap or snap back to the surface of the support base B and the energy will be transmitted through the sheet 10 from the point 12 to the contacts 16 and 18 and it will cause the sheet to fly up at the far end and into contact with contacts 32 as best illustrated in the phantom lines in FIGURES 2 and 3. The action is so rapid that it is scarcely visible to the human eye and takes place in a fraction of a second. The positioning of the operator 28 relative to the sheet or strip 10 and the point 12 is important as the operator 28 should be in relatively close proximity to the point 12 and relatively remote from the contacts 16 and 18. Generally speaking, the point 12 should be located a substantial distance from the contacts and in relatively close proximity to the point on the edge of the sheet where the operator 28 engages the sheet. Location of the point 12 and of the point of contact of the operator 28 as at 39 are critical and the second point or point of contact of the operator should be located closer to the first point 12 than the movable contacts 16 and 18 and preferably at points from said first point less than half the distance between the first point 12 and the movable contact 16 and/or 18.

The sheet 10 may act as an operator on a pressure sensitive switch such as broadly indicated at 32, then the edge of the sheet 10 may not require contacts 18 or 16 and the surface of the sheet 10 will merely engage pressure sensitive contacts such as 32 to cause an operation thereof when the sheet is flexed and released to cause snapping action and rise of the end of the sheet remote from the point of contact of the operator 28.

The point at which the operator 28 engages the edge of the sheet 10 may be considerably closer to the rivet 14 than illustrated in the drawings. The closer to the rivet 14 that the point of contact of the operator 28 comes, the more the snap action due to the increase in stored energy.

The base B may support the entire surface area of the sheet 10 and need not support only an area around the rivet 14 as generally shown in the drawings. The device will still operate though the sheet 10 is flush with the surface of the base B throughout its entire bottom surface area.

The sheet 10 should be flexible but also should have a certain amount of rigidity so as to be able to maintain itself in a horizontal position without having the ends droop.

*FIGURES 4 through 8*

Figure 4:
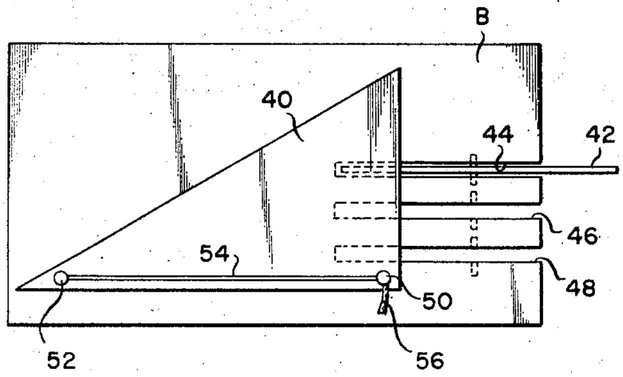
FIGURES 4, 5, 6, 7 and 8 are top plan views illustrating various embodiments of this invention.

In FIGURE 4, the base B entirely supports the sheet or flexible leaf member 40 which as noted is triangular in shape. The operator 42 may be moved from slot 44 to slots 46 and 48 for purposes of increasing or decreasing the amount of snap desired.

In FIGURES 4 through 8, the upper contact member or pressure sensitive switch similar to that disclosed in FIGURES 1 through 3 and indicated by numeral 32 is not shown. It is obvious that stationary contacts would be placed above the sheet member 40 and the other sheet members hereinafter described.

Sheet 40 is secured to the base B by a rivet 50 or the like. A movable contact 52 is conductively linked to the rivet 50 by means of a printed circuit 54. A lead 56 extends to the rivet 50 and is connected to a circuit (not shown).

Figures 5, 6, 8:
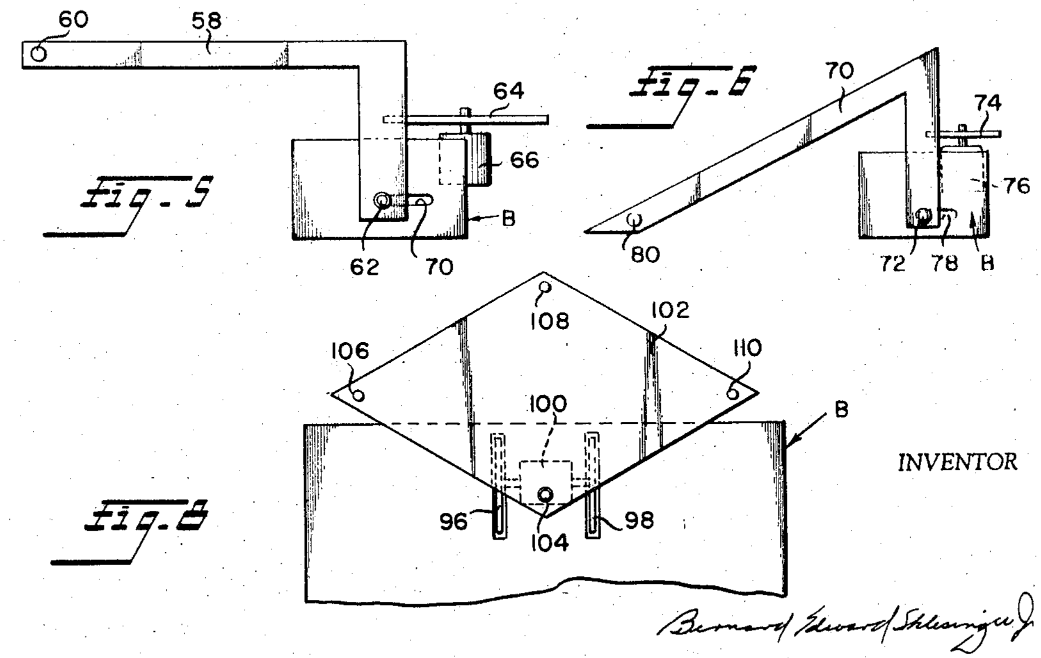

FIGURE 5 shows a base member B supporting an L-shaped sheet member 58. The L-shaped member may be conductive and is provided with a contact 60. The leg of the L-shaped member is riveted or otherwise secured to the base B by a securing device 62. An operator 64 is driven by a motor 66 which may be supported on the base member B. A slot 70 is provided to allow for adjustability of the sheet member 58.

FIGURE 6 is similar to FIGURE 5 and shows a sheet or leaf member 70 secured to the base B by a screw or bolt 72. An operator 74 engages an edge of the sheet or leaf member 70 and is driven by a motor 76. An adjustment slot 78 is provided for increasing or decreasing the amount of flex at the end of the sheet member 70 in the area of the contact 80.

Figure 7:
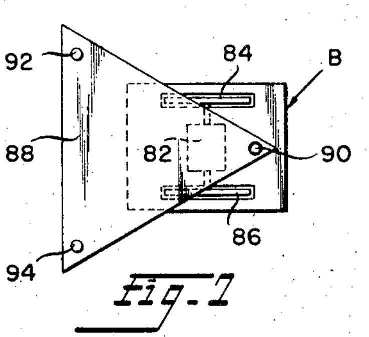

FIGURE 7 shows a base B having a motor 82 driving a pair of operators 84 and 86. A triangular sheet or leaf member 88 is secured to the base B by a bolt or the like 90. Contacts 92 and 94 are provided at the end of the sheet 88. In this particular modification, the operators can be alternately flexed or individually flexed as desired to cause operation of both or in alternate fashion the left hand and then the right hand contacts 94 and 92 respectively.

FIGURE 8 shows a base B with two operators 96 and 98 driven by a motor 100. The diamond shaped sheet 102 is secured to the base B by a rivet or the like 104. Contacts 106, 108 and 110 can be operated selectively as desired by a gear clutching arrangement not shown connected to the operators 96 and 98 through the motor 100.

*FIGURES 9 through 14*

Figure 9:
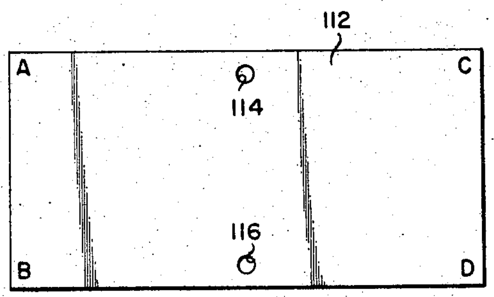
FIGURES 9 through 14 are top plan views illustrating various sheet or leaf members which are utilized in the switch device.

FIGURES 9 through 14 show various sheet members which can be utilized in conjunction with a base member and an operator. The operator may be motor driven or manually operated as for example the operator 42 in FIGURE 4. In FIGURE 9, the sheet 112 is provided with holes 114 and 116 so that the sheet may be placed either on a right hand or left hand mount for a specific operator. The holes are centrally located so that if the sheet 112 is secured at the hole 114, flexing in the area of 114 will cause the areas B and D to make contact depending upon which side of the hole 114 the operator acts. If for example the operator acts on the left hand side of the hole 114, the contact areas B and D will operate though the area D will have a greater bounce or vertical rise than the area B. Similarly, if the sheet 112 is fixed to a base support at the hole 116 and the operator operates adjacent the hole 116, the contact areas A and C will be flexed to operate contacts.

Figure 10:
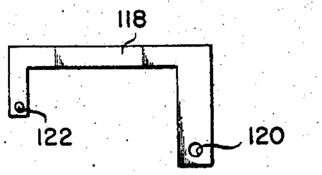

FIGURE 10 shows a C-shaped sheet member 118 provided with a hole 120 for securement to a panel board. The arrangement illustrated provides for action of the contact 122 around a corner or behind a wall remote from the area of the operator.

Figure 11:
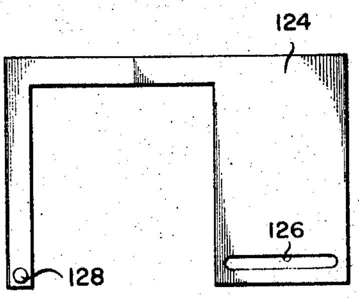

FIGURE 11 shows a device similar to FIGURE 10 in which the sheet member 124 is provided with an adjustment slot 126 to provide for variation in flex. The contact 128 allows for remote action around a corner or the like.

Figure 12:
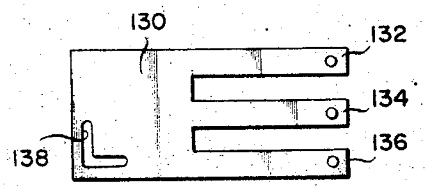

FIGURE 12 shows a sheet member 130 with a series of flex fingers 132, 134 and 136. The sheet 130 is secured to a panel board through a hole 138. When the operator flexes the sheet 130, the fingers or legs 132, 134 and 136 operate successively to close a series of switches or the like.

Figure 13:
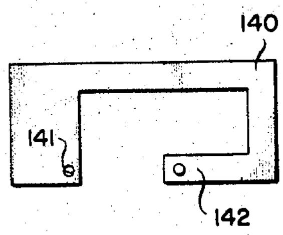

FIGURE 13 is a sheet member somewhat similar to FIGURES 10 and 11 in which the sheet member 140 is provided with an arm 142 which turns back towards the securing opening or hole 141. This arrangement provides additional latitude for operating around corners or posts or the like in switching structures.

Figure 14:
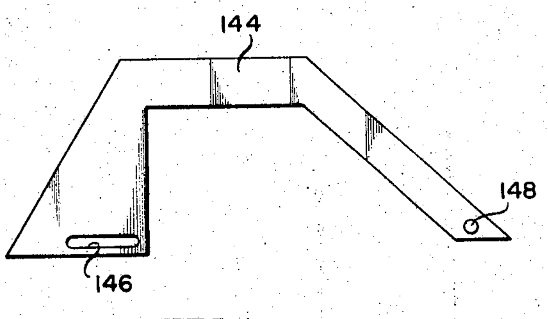

FIGURE 14 shows a sheet member 144 with a slightly different configuration than the structure in FIGURE 11 and designed to provide for clearance in certain areas. A slot 146 is provided for adjustable securement to a board or base. A contact 148 is provided though it may be unnecessary where the sheet 144 is metal and the tip or end of the sheeet 144 in the area of the contact 148 would in actuality be the contacting surface.

*FIGURE 15*

Figure 15:
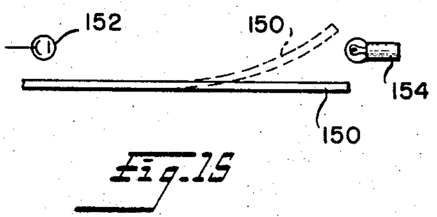
FIGURE 15 is a fragmentary side elevational view showing this device used in conjunction with photocells or the like and illustrating the snap action in phantom lines.

FIGURE 15 illustrates how a flexible sheet 150 utilizing the principles of this invention can be used to operate a photocell 152. The beam from the lamp 154 will be broken when the sheet member or leaf 150 flexes upwardly into the beam.

Figure 16:
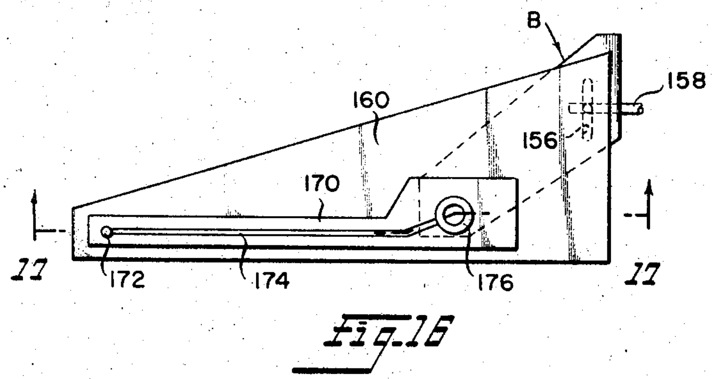
FIGURE 16 is a top elevational view illustrating yet another embodiment of this invention.
Figure 17:
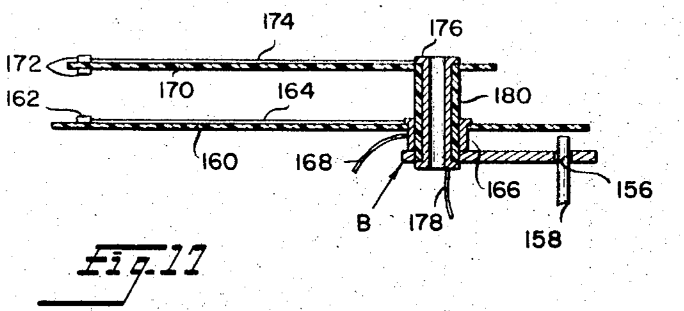
FIGURE 17 is a cross sectional view taken along the lines 17—17 of FIGURE 16 and viewed in the direction of the arrows.

*FIGURES 16 and 17*

In FIGURES 16 and 17, a base member B is provided with a slot 156 for receipt of a compressed air or fluid nozzle 158 is connected to a fluid pressure tank (not shown). A fluid pressure release and cut off mechanism (not shown) would be used in conjunction with the nozzle 158. The nozzle 158 is adjustable along the slot 156 for increasing the flex as desired.

Secured to the board or base B is a flexible sheet member 160. On the sheet 160 is a contact 162 and a printed circuit 164 extends from the contact 162 and connects to a conductive sleeve 166 which in turn is connected to a lead 168 for connection to a circuit (not shown).

Mounted above the sheet 160 is a stationary sheet or leaf 170. The leaf 170 is provided with a contact 172 which in turn connects with a printed circuit 174 which is connected to a conductive sleeve 176 for connection to a lead 178 which in turn connects to a circuit system (not shown). An insulated sleeve 180 prevents shorting of the sleeve 160 with the sleeve 176.

OPERATION OF FIGURES 16 AND 17

In the operation of FIGURES 16 and 17, air or the like is injected at high speed against the sheet 160. The pressure raises the sheet 160 and upon immediate cut-off the sheet will drop back into normal position causing a snap action and causing the contacts 162 and 172 to come together to close the circuit. It will be obvious that high pressure and very fast cut off of pressure will be necessary in order to operate the switch properly.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention, what I claim is:

1. A snap acting switch device comprising:
(a) a base member having an impact surface area,
(b) a flexible sheet having an impact surface area cooperating with and in abutting relation to the impact area of said base member,
(c) means for securing said flexible sheet to said base member at a first point for permitting movement of said flexible sheet to initial contact, load, release, impact and snap action positions,
(d) an operator having a manipulator thereon,
(e) a moveable contact area on said sheet and spaced a substantial distance from said first point,
(f) a stationary contact area spaced from said sheet and supported and positioned above said movable contact area,
(g) said manipulator engageable with an edge of said sheet and at a second point thereon and at a substantial distance from said moveable contact area,
(h) said manipulator having a first position in engagement with and located beneath the plane of said sheet during initial contact and load positions of said sheet, and
(i) said manipulator having a second position in non-engagement with and located above the plane of said sheet during release, impact, and snap action positions of said sheet,
(j) whereby when said manipulator is moved to its first and second positions in sequence, said flexible sheet impact area will impact on said base member impact area, so that said moveable contact area and said station-contact area will engage so as to operate a circuit.

2. A snap action switch device as in claim 28 and wherein:
(a) said drive includes a plurality of said operators spaced from each other and each including a manipulator for manipulating different edge portions of said sheet to selectively cause engagement of different moveable and stationary contact areas so as to selectively operate different circuits.

3. A snap action switch device as in claim 29 and wherein:
(a) said device includes a plurality of said operators spaced from each other and each including a manipulator for manipulating different edge portions of said sheet to selectively cause engagement of different moveable and stationary contact areas so as to selectively operate different circuits.

4. A snap acting switch device comprising:
(a) a base member having an impact surface area,
(b) a flexible sheet having an impact surface area cooperating with and in abutting relation to the impact area of said base member,
(c) means for securing said flexible sheet to said base member at a first point for permitting movement of said flexible sheet to initial contact, load, release, impact and snap action positions,
(d) an operator having a manipulator theron,
(e) a moveable actuator area on said sheet and spaced a substantial distance from said first point,
(f) a stationary sensing device spaced from said sheet and supported and positioned above said moveable actuator area,
(g) said manipulator engageable with an edge of said sheet and at a second point thereon and at a substantial distance from said moveable actuator area,
(h) said manipulator having a first position in engagement with and located beneath the plane of said sheet during initial contact and load positions of said sheet,
(i) said manipulator having a second position in non-engagement with and located above the plane of said sheet during release, impact and snap action positions of said sheet,
(j) said second point being located closer to said first point than to said moveable actuator area, and
(k) said stationary sensing device including a photocell positioned in the path of travel of said sheet,
(l) whereby when said manipulator is moved to its first and second positions in sequence, said flexible sheet impact area will impact on said base member impact area, so that said moveable actuator will interrupt said photocell thereby to operate a circuit.

5. A snap acting switch device as in claim 1 and wherein:
(a) said second point is located closer to said first point than said movable contact area.

6. A snap acting switch device as in claim 1 and wherein:
(a) said second point is located from said first point less than half the distance between said first point and said movable contact area.

7. A snap acting switch device as in claim 6 and wherein:
(a) said first point is located between said second point and said movable contact area.

8. A snap acting switch device as in claim 6 and wherein:
(b) said second point is located in close proximity to said first point.

9. A snap acting switch device as in claim 1 and wherein:
(a) said base member has a surface portion extending beneath said sheet and substantially coplanar therewith.

10. A snap acting switch device as in claim 1 and wherein:
(a) said base member has a surface portion extending beneath at least half said sheet and said sheet in initial contact position rests thereon.

11. A snap acting switch device as in claim 1 and wherein:
(a) said base member has a substantial surface portion beneath said sheet in the area about said first point for supporting said sheet in initial contact position.

12. A snap acting switch device as in claim 1 and wherein:
(a) the distance between said movable and stationary contact areas are greater than the distance between said first and second points when said device is in initial contact position.

13. A snap action switch device as in claim 1 and wherein:

(a) the greatest vertical distance traveled by said sheet in load position at least approximates the greatest vertical distance traveled by said sheet in snap action position.

14. A snap action switch device as in claim 5 and wherein:

(a) said sheet is generally rectangularly shaped.

15. A snap action switch device as in claim 5 and wherein:

(a) said sheet is generally triangularly shaped.

16. A snap action switch device as in claim 5 and wherein:

(a) said sheet is generally U-shaped.

17. A snap action switch device as in claim 5 and wherein:

(a) said sheet is diamond shaped.

18. A snap action switch device as in claim 5 and wherein:

(a) said sheet includes at least one extending leg.

19. A snap action switch device as in claim 11 and wherein:

(a) said sheet is generally rectangularly shaped.

20. A snap action switch device as in claim 11 and wherein:

(a) said sheet is generally triangularly shaped.

21. A snap action switch device as in claim 11 and wherein:

(a) said sheet is generally U-shaped.

22. A snap action switch device as in claim 11 and wherein:

(a) said sheet is diamond shaped.

23. A snap action switch device as in claim 11 and wherein:

(a) said sheet includes at least one extending leg.

24. A snap action switch device as in claim 5 and wherein:

(a) said sheet is irregularly shaped.

25. A snap action switch device as in claim 11 and wherein:

(a) said sheet is irregularly shaped.

26. A snap action switch device as in claim 5 and wherein:

(a) said sheet includes a printed circuit.

27. A snap action switch device as in claim 11 and wherein:

(a) said sheet includes a printed circuit.

28. A snap action switch device as in claim 5 and wherein:

(a) said device includes a plurality of movable and stationary contact areas.

29. A snap action switch device as in claim 11 and wherein:

(a) said device includes a plurality of movable and stationary contact areas.

30. A snap action switch device as in claim 2 and wherein:

(a) said operators are positioned on either side of said first point.

31. A snap action switch device as in claim 3 and wherein:

(a) said operators are positioned on either side of said first point.

32. A snap acting switch device comprising:

(a) a base member, (b) a flexible sheet secured at a first point to said base member and having initial contact, load, release, and snap action positions, (c) an operator therefor, (d) a movable contact area on said sheet and spaced a substantial distance from said first point, (e) a stationary contact area spaced from said sheet and supported and positioned above said movable contact area, (f) said operator having means for lifting an edge of said sheet and at a second point thereon and at a substantial distance from said movable contact area, (g) said second point being located closer to said first point than to said movable contact areaby less than half the distance between said first point and said movable contact area, and (h) said base member having a portion around said first point flush with the under surface of said flexible sheet so as to limit downward travel of at least a portion of said sheet while permitting upward travel thereof, (i) said operator means including means for supporting said sheet in a raised position and means for suddenly releasing said sheet in said raised position to permit it to snap downwardly, (j) whereby when said operator means suddenly releases said sheet from load position, a snap action position results transferring energy to another part of said sheet to cause the other part to suddenly raise in the same direction as initially thereby to cause said movable contact area to come into engagement with said stationary contact area to complete a circuit.

33. A snap acting switch as in claim 32 and wherein:

(a) said operator means includes a fluid pressure high speed on and off system.

34. A snap acting switch as in claim 33 and wherein:

(a) said on and off system includes a pressure nozzle.

References Cited

UNITED STATES PATENTS 3,204,070 7/1965 Marano ------------ 200—160
3,261,936 7/1966 Cayo.

ROBERT S. MACON, *Primary Examiner.*

D. SMITH, Jr., *Assistant Examiner.*